Oct. 29, 1963 P. KUNDIKOFF 3,108,729
ANIMAL CONTAINER CONSTRUCTION
Filed April 20, 1961
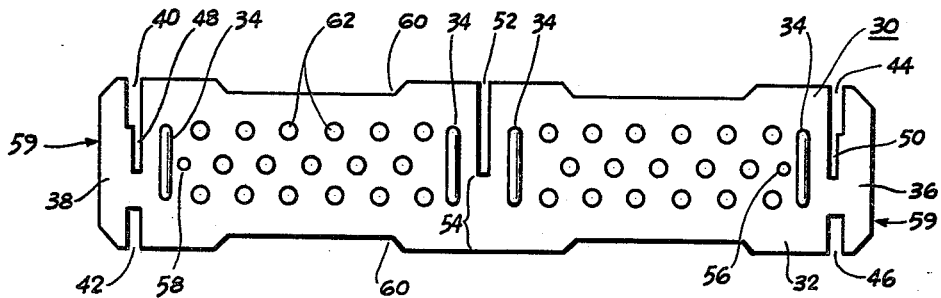
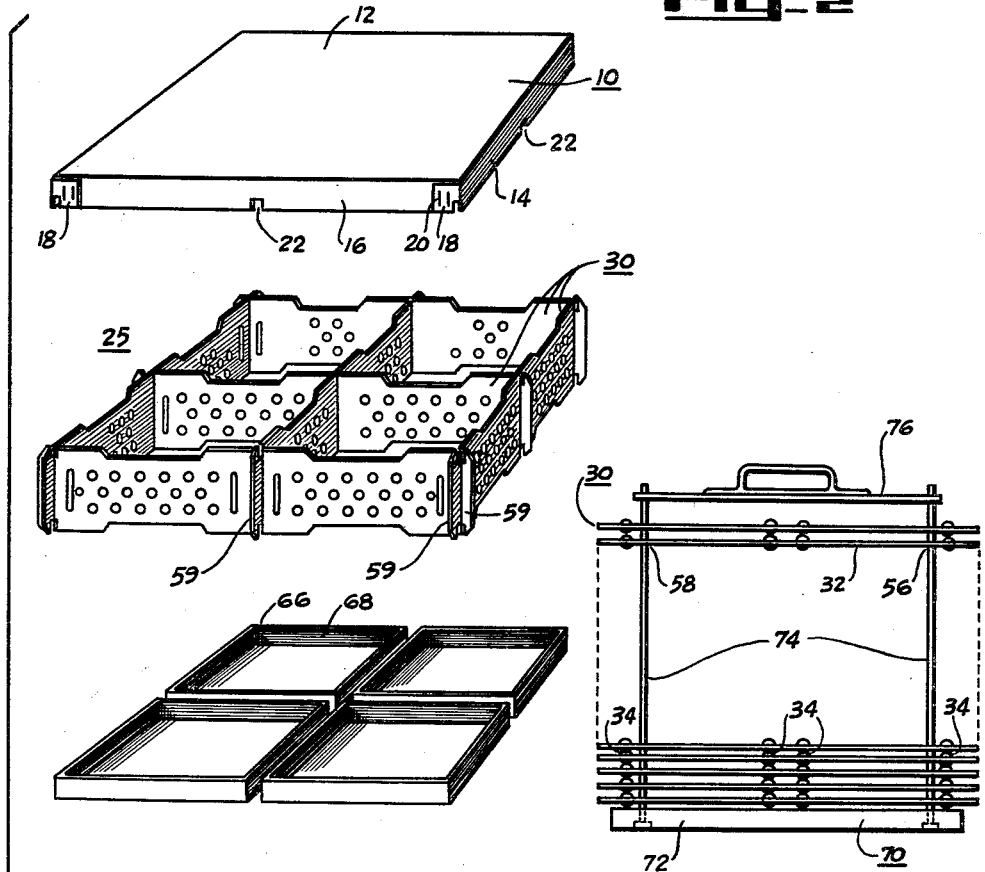
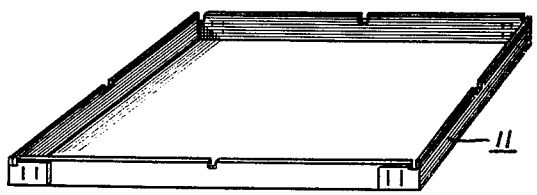
INVENTOR.
PETER KUNDIKOFF.
BY
ATTORNEY.

United States Patent Office 3,108,729
Patented Oct. 29, 1963

3,108,729
ANIMAL CONTAINER CONSTRUCTION
Peter Kundikoff, Rte. 4, Box 437, Escondido, Calif.
Filed Apr. 20, 1961, Ser. No. 104,300
3 Claims. (Cl. 229—6)

This invention relates to an animal container construction, and more particularly to an improvement in the construction of such a container for carrying live animals, particularly transportation of live baby chicks.

While, however, the preferred embodiment of this invention is described in connection with the transport and delivery of baby chicks, it should be understood that the scope of the invention may logically be extended to other animals in which analogous problems are encountered.

Baby chicks are normally transported by the hatchery to the poultryman in a four compartment container. Each compartment holds approximately 25 or 26 live chicks. The sides of the container and the inside walls of the compartment are normally perforated to provide ventilation for the chicks during shipment. As the chicks normally arrive from the hatchery at the poultryman's establishment, they are removed from the box and placed under brooders.

In my prior application, Serial No. 40,642, filed on or about July 5, 1960, and entitled "Combination Shipping and Sanitary Feeding Means for Animals" I disclose the use of trays from the shipping container to be used as feed trays. The trays that the chicks are upon during shipping, serve as their feed tray during brooding. The sides or edges of the trays are made just high enough to conveniently retain the feed therein and permit the chick to step over to move onto or from the feed tray.

In this present invention I disclose such container construction in which the top and the bottom may be used for feed trays and smaller feed trays may be placed in each of the compartments. The partition sections of the compartments are, however, readily assembled and disassembled for reuse of the container by the hatchery. These partition sections or compartment dividers must be sterilized prior to their reuse, and therefore are reusable many times over.

I have determined that the reuse of the partition sections in the manner in which I will further disclose will provide a considerable saving to both the hatchery and the poultryman.

In addition to the aforestated, it is one of the objects of my invention to provide a readily demountable animal container in which the partition sections may be quickly and readily removed one from another, for subsequent reuse.

It is another object of my invention to provide a partition section so constructed as to facilitate its use with like partition sections to effect a compartmented animal container.

It is another object of my invention to provide a readily mountable and demountable animal container using like-constructed partition sections which may be removed therefrom and stored one lying flat upon another in spaced relation with each other so as to facilitate transport and sterilization of the partition sections for subsequent reuse thereof.

Other objects and advantages will appear hereinafter as the description of the invention proceeds. The novel teachings of the invention and how the objects are attained will appear more fully from the specification and the accompanying drawings, showing embodiments of the invention, and forming a part of the specification hereof, and all of these novel features as are and intended to be pointed out in the appended claims.

In the drawings:

FIGURE 1 is an exploded view of the animal container illustrating the readily demountable construction thereof;

FIGURE 2 is an enlarged view in elevation of a partition section utilized in the container construction of FIGURE 1;

FIGURE 3 is a front view of a stacking structure carrying a plurality of partition sections in a flat or lying-down position.

FIGURE 1 is a detailed showing of the construction of the preferred embodiment. Shown in FIGURE 1 is a box top 10 and a box bottom 11. It should be noted that both box top 10 and box bottom 11 are of similar construction and design. For most purposes they may be constructed of cardboard or plastic material. As both the top and bottom are of like construction, only box top 10 will be described in detail.

Projecting from the top part 12 of box top 10 are sides 14 and 16. As is shown in FIGURE 1, side 14 may have flat portions 18 overlaying side 16 and fastened thereto by means of staples 20. Side walls 14 and 16 further present notched parts 22 which provide a way of locking the cover with subsequently described structure of the container.

Between the top 10 and the bottom 11 there is disposed a compartmented construction 25 having one or more compartments. As the usual animal container used in chick transportation has four compartments, the compartmented construction 25 is illustrated as having four compartments. However, it should be clearly understood that one or more compartments utilizing the construction described herein is encompassed by the present invention.

The compartment construction 25 comprises a plurality of like constructed partition sections 30 capable of interlocking one with the other. It should also be noticed that in the embodiment shown, the partition sections are exemplified as of like length. This is not necessarily the case, however. It is clearly within the ambit of the present invention that partition sections 30 could be of an unequal length so as to provide a rectangular container, for example.

FIGURE 2 shows a more detailed description of partition section 30. Partition section 30, which may be made of cardboard or plastic or the like, includes a substantially planar rectangular member 32. Member 32 has protruding therefrom and from the plane in which it lies, at least two spaced-apart raised sections 34, and as shown in FIGURE 2, preferably four raised sections 34. Adjacent each of the extremities 36 and 38 of member 32 are formed in member 32 two opposed receiving slots 40 and 42, and 44 and 46. Slots 40, 42, 44 and 46 are so constructed as to be able to receive therein portions of box top 10, at the notched parts 22 and the remainder of the bottom of the edge portion 14 or 16 above beyond the notched part to hold them thereon.

In addition, there is also provided adjacent extremity 38 and 36, respectively, an elongated slot portion 48 and 50. The elongated slots 48 and 50 are provided substantially past center of the flat up-and-down dimension of member 32 as shown in FIGURE 2, so as to receive a like slot and a body of a like member therein, constructed together as shown in container 25 of FIGURE 1. Intermediate the two extremities 36 and 38 of member 32 and substantially midway between is provided another single slot 52 also open slightly past center between the top and the bottom of the plane section of member 32 as shown in FIGURE 2. Single slot 52 is adapted to receive mated like constructed partition section slot and the remaining body portion 54 of a like constructed partition section for fastening engagement one with the other. Partition section 30 has its member 32 further present a pair of spaced-apart openings 56 and 58. Openings 56 and 58 are capable of receiving therethrough for mounting the partition section thereon, cooperating elements of a stacking structure, as is further shown and described with respect to FIGURE 3.

In order to provide adequate ventilation between compartments and throughout the entire container construction, relief sections 60 may be formed in member 32, as well as ventilating openings 62, all in such quantity and of such shape as may be desired to provide the adequate ventilation desired in the overall container compartment construction 25.

The partition section shown in FIGURE 2, as 30, together with five other like constructed partition sections, may then be interlocked to form the compartmented construction 25 as shown in FIGURE 1. Partition section 30 has its member 32 provided with end parts 59 at the extremity of either end of member 32. The end parts 59 in the finished assembled container construction 25 extend beyond the container to provide a predetermined spacing for adjoining box constructions when stacked together in transport. The extension of the end parts 59 determines the separation between the stacked boxes to permit sufficient ventilation.

When the container is provided with four compartments as shown in FIGURE 1, it is also desirable to use in each one of the compartments an independent bottom tray 66 to contain the chicks and later to be removed therefrom to provide feeding trays. Of course both box top 10 and box bottom 11 may likewise be used for feeding trays. The height of the edges 14 and 16 of box top 10 and box bottom 11, as well as the height of edge 68 of one of the trays 66, is so determined as to provide an easy step-over distance for the gait of chicks of that tender age. This enables the chicks to leave the box and to come back to it, cross over the edge 68, or 14 and 16, in order to feed therein.

After the container is used for transportation of the chicks from the hatchery to the poultryman, the present invention envisions reuse of the demountable partition sections in the construction of the compartments by removing them from engagement one with the other and placing them flat-wise upon a stacking structure 70. Stacking structure 70 shown in FIGURE 3 includes a base 72 with two spaced-apart carrying elements 74. Elements 74 are exemplified as rods mounted upon and extending perpendicularly from the base 72. Mounted at the free end of the elements 74 is a carrying enclosure cover 76 which may be pressed against the stacked sections fastening them together and facilitating their transport. After the containers are used, the compartmented construction 25 may be disassembled by removal of each of the partition sections 30 from slotted engagement with like partition sections, and mounting the partition sections 30 upon and through the stacking openings 58 and 56 in member 32, on the rods or elements 74, thus stacking them flat one upon the other, as is shown in FIGURE 3. When this is accomplished the raised portions 34 bear against raised portions of like partition sections to provide a predetermined spacing therebetween. The predetermined spacing permits ready access to the flat surface of the partition sections 30 to permit sterilization of the sections for subsequent reuse. Thus the sections 30 may be shipped from the poultryman back to the hatchery on the stacking structure 70 as shown in FIGURE 3, ready upon receipt by the hatchery for both sterilization and subsequent reuse. This saves the partition sections for reuse and saves considerable money between the hatchery and the poultryman in the transport of the baby chicks.

The invention may be embodied in other specific forms without departing from the essential characteristics thereof, hence the present embodiment thereof is to be considered in all respects to be merely illustrative and not being restrictive, the scope of the invention being indicated by the appended claims, rather than by the foregoing description, and all modifications and variations as fall within the meaning and purview and range of equivalency of the appended claims are therefore intended to be embraced therein.

What it is desired to claim and secure by Letters Patent of the United States is:

1. A chick box construction employing reusable partition sections comprising a box top, a box bottom, and walls therebetween defined entirely by a plurality of like partition sections as defined in claim 6, edge bearing against said box top and said box bottom, each partition section being adapted to interlock with others of said sections to form at least one compartment therebetween, said box top and said box bottom each interlocking with each of the partition sections, and a separate tray member disposed upon the box bottom in each compartment so formed, said box top, box bottom and tray members each being removable therefrom to serve as feeding trays for chicks transported in the box construction, said partition sections being capable of quick removal from interlocking engagement to be reused.

2. A reusable partition section for use in a chick box construction having a box top and box bottom, said partition section comprising a substantially planar rectangular member, said member presenting at least two spaced apart raised sections formed upon and protruding from the plane of said planar member, said member having formed therethrough adjacent each extremity thereof at least two opposed receiving slots, each of said slots being capable of receiving selectively a box top and a box bottom and one of the opposed slots possessing a stepped shape defining a slot at the edge of said partition of a width sufficient to receive a box top or box bottom and a narrower portion extending inwardly from said wider portion and of a width capable of receiving a like mating slot of a like partition section, said member presenting adjacent to each of its extremities edge parts extending from said opposed slots to said extremities, said edge parts being adapted to separate the partitions in adjacent boxes when a plurality of boxes are assembled in side-by-side relationship, said rectangular planar member presenting substantially midway intermediate the extremities thereof another single slot formed therethrough, which slot is capable of receiving a mated like slot of a like partition section, said member being further provided with a pair of spaced apart openings through the member for mounting the partition section upon a stacking structure, said spaced apart raised portions being adapted to cause spacing of the partition sections from another when in stacked relation said substantially planar member having formed therein a plurality of ventilating openings, said ventilating openings to permit air circulation through the box construction, said partition section forming a wall of the box construction.

3. A chick box construction employing reusable partition sections, said construction comprising a box top, a box bottom, and walls therebetween defined entirely by six like partition sections as defined in claim 2, each bearing against said box top and said box bottom, each partition section interlocking with three other said sections and all together forming four compartments intermediate said box top and said box bottom each interlocking with said partition sections, said sections being capable of rapid removal from interlocking engagement to permit reuse of said sections.

References Cited in the file of this patent
UNITED STATES PATENTS

| | | |
|---|---|---|
| 1,382,787 | La Bombard | June 28, 1921 |
| 1,785,416 | La Bombard | Dec. 16, 1930 |
| 1,945,878 | Breton | Feb. 6, 1934 |
| 2,026,417 | Conway | Dec. 31, 1935 |
| 2,409,701 | Loth | Oct. 22, 1946 |
| 2,709,031 | Gondek | May 24, 1955 |